No. 857,490. PATENTED JUNE 18, 1907.
W. W. SATTERTHWAITE.
SPEED REGULATOR FOR PUMPS.
APPLICATION FILED OCT. 31, 1906.
3 SHEETS—SHEET 2.
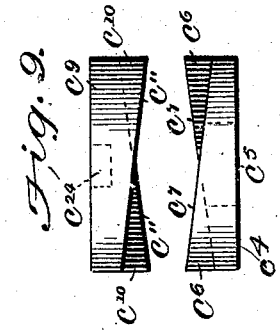
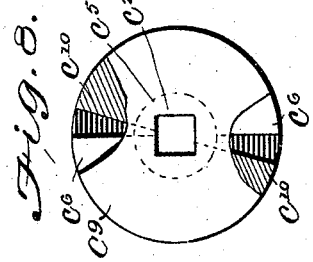
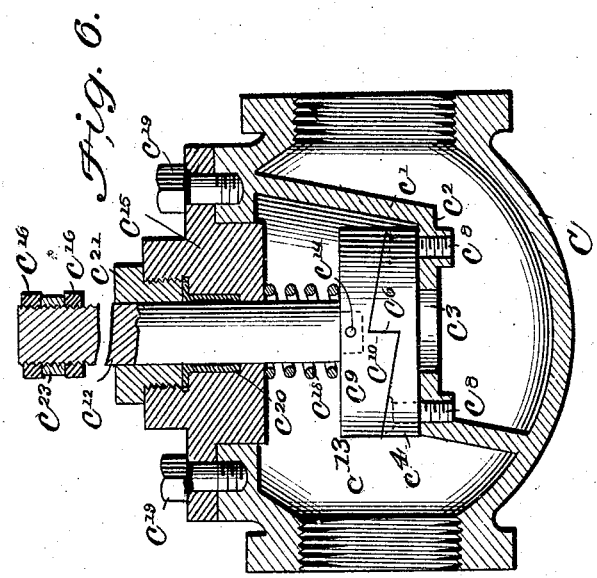
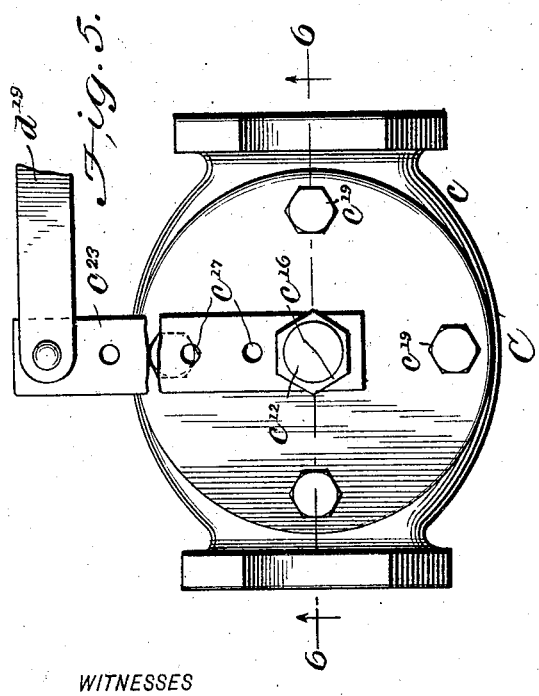
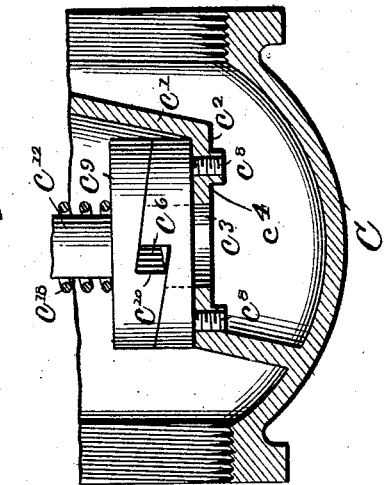
WITNESSES
INVENTOR
WM. W. SATTERTHWAITE
BY Munn & Co.
ATTORNEYS

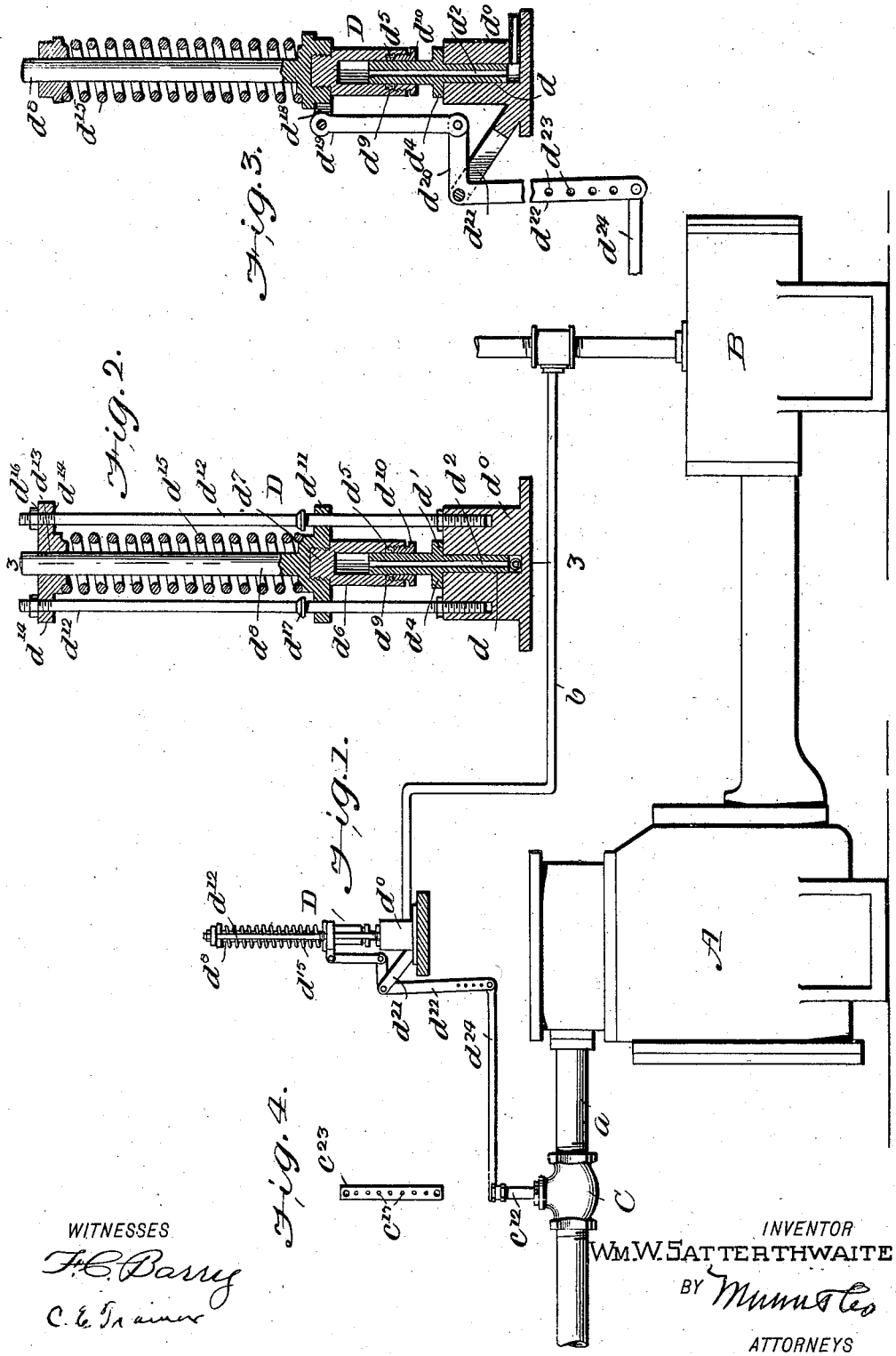

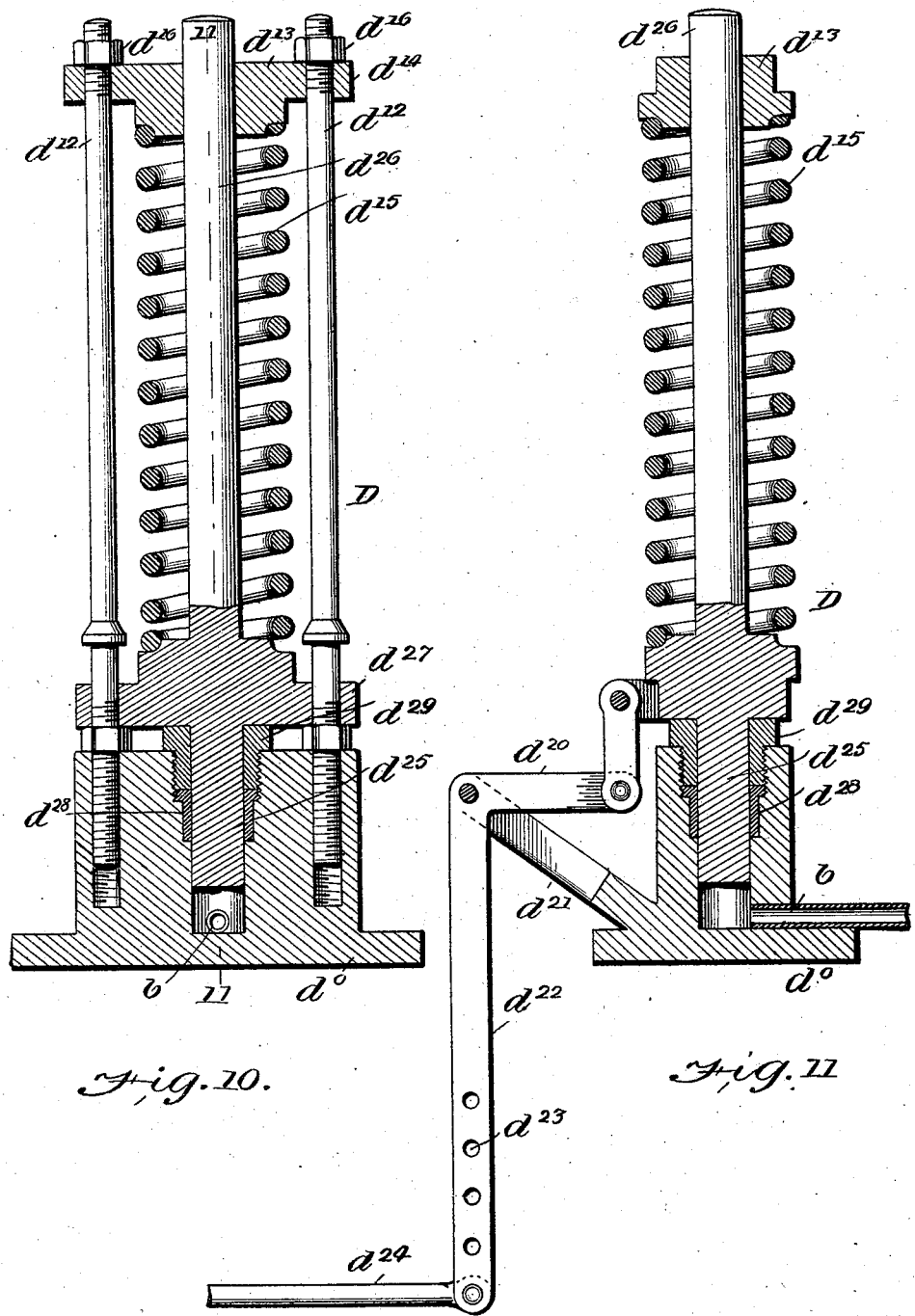

UNITED STATES PATENT OFFICE.

WILLIAM W. SATTERTHWAITE, OF WASHINGTON, NORTH CAROLINA.

SPEED-REGULATOR FOR PUMPS.

No. 857,490.     Specification of Letters Patent.     Patented June 18, 1907.

Application filed October 31, 1906. Serial No. 341,459.

*To all whom it may concern:*

Be it known that I, WILLIAM W. SATTERTHWAITE, a citizen of the United States, and a resident of Washington, in the county of Beaufort and State of North Carolina, have made certain new and useful Improvements in Speed-Regulators for Fluid-Operated Pumps, of which the following is a specification.

My invention is an improvement in speed regulators for fluid pumps, and consists in certain novel constructions and combinations of parts hereinafter described and claimed.

Referring to the drawings forming a part hereof—Figure 1 is a side view of a fluid operated pump provided with my improvement. Fig. 2 is a vertical longitudinal section through the speed regulating mechanism, Fig. 3 is a section on the line 3—3 of Fig. 2. Fig. 4 is a plan view of the valve stem arm. Fig. 5 is a top plan view of the exhaust pipe valve. Fig. 6 is a section on the line 6—6 of Fig. 5. Fig. 7 is a view similar to Fig. 6, partly broken away and showing the valve partly open. Fig. 8 is a top plan view of the valve, and Fig. 9 is a side view showing the valve separated from its seat. Fig. 10 is a vertical longitudinal section of a modification of the speed regulating mechanism. Fig. 11 is a section on the line 11—11 of Fig. 10.

In the present embodiment of my invention, I have shown the same applied to a fluid operated pump A, provided with an exhaust pipe $a$ connected with the hydraulic cylinder B. A valve C is interposed in the exhaust pipe of the pump, the said valve comprising a casing $c$, provided with a partition $c'$, having a substantially horizontal portion $c^2$ with an opening $c^3$ therethrough. A circular valve seat $c^4$ is secured to the horizontal portion $c^2$ of the partition by means of screws $c^8$, and the said valve seat is provided with an opening $c^5$, registering with the opening $c^3$ through the partition.

The upper face of the valve seat is provided with oppositely arranged shoulders $c^6$, connected by inclined surfaces $c^7$; and the valve $c^9$ is circular and is provided with shoulders $c^{10}$ and inclined surfaces $c^{11}$ similar to the shoulders $c^6$ and inclined surfaces $c^7$ of the valve seat, and the said valve normally rests upon the valve seat, with its shoulders in contact with the shoulders of the valve seat, thus closing the opening through the said seat.

A valve stem $c^{12}$ provided with a reduced squared end $c^{13}$ engages an opening $c^{24}$ in the valve, and is secured in the opening by means of a pin $c^{14}$. The bonnet $c^{15}$ of the valve is secured to the casing by means of the bolts $c^{19}$ traversing openings in the bonnet and threaded into the casing, and the said bonnet is provided with a recess for receiving a packing $c^{20}$, retained in position by a packing nut $c^{21}$ encircling the stem and threaded into the bonnet. A spring $c^{18}$ is arranged between the bonnet and the valve,—the spring being unnecessary, however, except when the valve is operated in an inverted position.

The end of the valve stem is threaded as at $c^{22}$, and is engaged by the threaded opening of an arm $c^{23}$, the said arm being secured in its adjusted position by means of lock nuts $c^{16}$, and being provided with a plurality of openings $c^{17}$, for a purpose to be hereinafter described.

The speed regulator D comprises a casing $d^0$ having an opening in which works one end $d$ of a plunger $d'$, the said plunger having a longitudinal opening $d^2$ therethrough, and being provided with an annular shoulder $d^4$, for a purpose to be hereinafter described.

The upper end $d^5$ of the plunger $d'$ is of greater diameter than the lower end, and works within a cylinder $d^6$, the upper end of the cylinder being reduced as at $d^7$ and threaded into the lower enlarged end of the stem $d^8$, and packing $d^9$ encircles the end $d^5$ of the plunger within the casing and is retained in place by a packing nut $d^{10}$.

The lower end of the stem $d^8$ is provided with an integral collar $d^{11}$ having openings to receive rods $d^{12}$, the said rods being arranged on each side of the stem and threaded into the casing $d^0$ as shown in Fig. 2. The upper end of the stem $d^8$ passes through a collar $d^{13}$, the collar being provided with oppositely arranged lugs $d^{14}$ for receiving the rods $d^{12}$; and a spring $d^{15}$ is arranged between the collar $d^{13}$ and the collar $d^{11}$ at the lower portion of the stem $d^8$. Nuts $d^{16}$ are threaded on the upper end of the rods $d^{12}$ to retain the collar $d^{13}$ in place, and shoulders $d^{17}$ are provided upon the rods for limiting the upward motion of the stem $d^8$.

The casing $d^0$ is connected with the hydraulic cylinder B by means of a pipe $b$ in such manner that pressure of the fluid in the cylinder or reservoir may act directly upon the plunger $d'$ and indirectly upon the stem $d^8$ through the passage $d$ in the said plunger $d'$.

The stem $d^8$ is provided with a lug $d^{18}$ to which is pivotally connected one end of a link $d^{19}$, the other end of the link being pivotally connected in its turn to one of the arms $d^{20}$ of an elbow lever pivoted to a bracket $d^{21}$ projecting from the casing. The other arm $d^{22}$ of the elbow lever is provided with a plurality of openings $d^{23}$, and a link $d^{24}$ connects the said arm $d^{21}$ of the elbow lever with the arm $c^{17}$ of the valve stem.

It will be evident from the description of the regulating mechanism, that by screwing the rods $d^{12}$ in or out of the threaded openings of the casing the position of the shoulders $d^{17}$ may be varied to adjust the movement of the stem $d^8$, and that by manipulating the nuts $d^{16}$ on the outer ends of the rods $d^{12}$, the tension of the spring $d^{15}$ may be varied to move the valve when the desired pressure is attained. By connecting the link $d^{24}$ with different holes in the arm $c^{23}$ and the arm $d^{22}$, the extent of movement of the valve may be adjusted whereby to vary the extent of the opening thereof.

In the operation of my device, when the pressure in the cylinder or reservoir B becomes sufficient to overcome the tension of the spring $d^{15}$, the stem $d^8$ is elevated and through its connection with the valve stem $c^{12}$ the valve is partially closed, thus slowing the exhaust and as a consequence slowing the pump. Further increase in the pressure in the cylinder will tend to further close the exhaust, thus nicely regulating the speed of the pump by the pressure in the cylinder.

When the valve is placed in the exhaust pipe as above described, the cylinders of the pump are maintained at about the same temperature, since the steam is maintained therein and not cut off as would be the case were it placed in the steam feed pipe.

It will be understood that when the pump is in operation the pipe $b$ and regulator D will contain a certain amount of fluid depending upon the pressure in the reservoir, and that an increase of such pressure will pass through the hole in the plunger $d^9$ in the cylinder $d^6$ tending to lift said cylinder until the yoke $d^{11}$ takes up against the lugs $d^{17}$.

My above described improvement may also be used as a rejector for steam or other fluid when there is a greater pressure of said fluid than is desired to be used. For instance should there be 200 pounds of steam in the boiler, and a 20 pound pressure is desired for a radiator, the valve may be set at 20 pounds pressure and so long as there is 20 pounds of steam in the boiler the radiator will receive that amount.

In Figs. 10 and 11 is shown a modification of the device in which the idle plunger is dispensed with, the fluid pressure acting directly upon the stem. In the above modification the speed regulator D comprises the casing $d^0$ having the opening in which works a plunger $d^{25}$, the said plunger having a stem $d^{26}$ extending without the casing and provided with an integral collar $d^{27}$ having openings for receiving the rods $d^{12}$ before described. The casing $d^0$ is provided with a recess around the plunger in which is arranged a packing $d^{28}$ secured in place by a packing nut $d^{29}$, and the casing is connected by the pipe $b$ with the pipe of the hydraulic cylinder B in the manner described.

In the operation of the modification, when pressure in the cylinder or reservoir B becomes sufficient to overcome the tension of the spring $d^{15}$ the plunger $d^{25}$ is elevated, thus partially closing the valve and slowing the pump. The above described modification is intended for use with a comparatively steady pressure, the first described form being preferably used when the pressure is subject to sudden variations.

It will be understood that the openings in the cylinder $d^6$ and the casing $d^0$ in which work the plunger $d'$ are coaxial, and the upper end of the said plunger is of greater diameter than the lower end, whereby the pressure of the fluid is reduced as it passes from the casing to the cylinder, thus resulting in a retarding of the action of the stem.

I claim:

1. In a speed regulator for fluid operated pumps, the combination with the pump and the reservoir for liquid under pressure connected therewith, of a casing connected with the reservoir, a stem above the casing and spaced apart therefrom, said stem having an integral collar at the end adjacent to the casing and a collar slidably mounted on the stem at the outer end thereof, rods threaded into the casing and extending parallel with the stem and upon each side thereof, said rods extending through both collars and having their free ends screwthreaded, shoulders on the rods for limiting the movement of the stem, nuts engaging the ends of the rods, a spring encircling the stem between the collars, a cylinder threaded into the lower end of the stem, the opening of the cylinder being coaxial with the opening of the casing, and a plunger having a relatively large end working in the cylinder and a relatively small end working in the casing, said plunger having a longitudinal opening therethrough, and an annular shoulder on the outer surface thereof for engaging the cylinder to limit the motion thereof, the shoulder resting upon the casing, a valve connected with the exhaust of the pump and a connection between the valve and the plunger whereby movement of the plunger will operate the valve.

2. In a speed regulator for fluid operated pumps, the combination with the pump and the reservoir for liquid under pressure connected therewith, of a casing connected with the reservoir, a cylinder arranged above the casing and spaced apart therefrom, the opening of the cylinder and the opening of the casing being coaxial with each other, a plunger having one end of relatively large diameter movable in the cylinder, and the other end of relatively small diameter movable in the casing, said plunger having a longitudinal opening therethrough, a valve connected with the exhaust of the pump, and a connection between the cylinder and the valve whereby the movement of the cylinder may operate the valve.

3. In a speed regulator for fluid operated pumps, the combination with the pump and the reservoir for liquid under pressure connected therewith, of a casing connected with the reservoir, a plunger movable in the casing and provided with a stem projecting therebeyond, said stem having an integral collar adjacent to the casing, and a collar slidably mounted on the stem, at the outer end thereof, rods threaded into the casing and extending parallel with the stem and upon each side thereof, said rods extending through both the collars and having their free ends screw threaded, shoulders on the rods for limiting the movement of the plunger, nuts engaging the ends of the rods, a spring encircling the stem between the collars, a valve connected with the exhaust of the pump, and a connection between the valve and the plunger whereby the movement of the plunger may operate the valve.

4. In a speed regulator for fluid operated pumps, the combination with the pump and reservoir for liquid under pressure, connected therewith, of a valve interposed in the exhaust of the pump, a casing connected with the reservoir, a plunger movable in the casing, a spring normally acting to move the plunger against the force of the liquid under pressure, means for regulating the tension of the spring, a bracket projecting from the casing, an elbow lever pivoted on the bracket, a link connecting the plunger with one of the arms of the elbow lever, and a connection between the other arm and the valve whereby movement of the plunger will operate said valve.

5. In a speed regulator for fluid operated pumps, the combination with the pump and the reservoir for liquid under pressure connected therewith, of a casing connected with the reservoir, a spring actuated plunger movable within the casing, a bracket projecting from the casing, an elbow lever journaled in the bracket, a connection between one of the arms of the elbow lever and the plunger, a valve in the exhaust pipe of the pump, and a connection between the valve and the other arm of the elbow lever, whereby movement of the plunger will open and close said valve.

6. In a speed regulator for fluid operated pumps, the combination with the pump and the reservoir for liquid under pressure connected therewith, of a valve interposed in the exhaust of the pump, said valve comprising a casing for a partition provided with an opening therethrough, a valve seat secured to the partition and having its outer face provided with oppositely arranged shoulders connected by inclined surfaces leading from the base of one shoulder to the top of the other, said seat having a central opening registering with the opening of the partition, a valve resting upon the seat and having oppositely arranged shoulders and inclined surfaces contacting with the shoulders and the inclined surfaces of the seat, a stem connected with the valve, a plunger acted upon by the pressure of the fluid in the reservoir, and a connection between the plunger and the valve stem whereby the movement of the plunger will operate the stem to open and close the valve.

WILLIAM W. SATTERTHWAITE.

Witnesses:
JNO. N. SMALL,
ANGUS D. MACLEAN.